INVENTOR.
DAVID L. EMMONS
BY Julian C. Renfro
ATTOR.

HIGH SPEED COMPARATOR

Filed Dec. 7, 1961 3 Sheets-Sheet 2

INVENTOR.
DAVID L. EMMONS
BY Julian C. Renfro
ATTOR.

INVENTOR.
DAVID L. EMMONS
BY
Julian C. Renfro
ATTOR.

United States Patent Office 3,237,159
Patented Feb. 22, 1966

3,237,159
HIGH SPEED COMPARATOR

David L. Emmons, Orlando, Fla., assignor to Martin-Marietta Corporation, Middle River, Md., a corporation of Maryland Filed Dec. 7, 1961, Ser. No. 157,808
10 Claims. (Cl. 340—146.2)

My invention relates to a comparator for effecting a simultaneous comparison of one number with two other numbers so as to arrive at a "in limts or not" conclusion, and more particularly to a configuration of electronic gates which performs a comparison between a number and two reference numbers, comparing each level of significance simultaneously, without a duplication of the equipment usually required for a single comparison of two numbers, and without separately comparing the given number with each of two other numbers using the same equipment but in a time sequence. However, my invention is not limited to a three-number arrangement, for this concept can be employed as a two-number comparator utilizing significantly less hardware than required for the same function by the prior art.

A frequent problem in test and checkout of equipments, in evaluating telemetered data, in high speed memory search equipment, and in numerous other applications is the determination whether or not certain data or a signal value is between predetermined limits. If the information in question is in binary digital form or if it can be converted to such form, the present invention can provide a fast direct method of determining whether the information is within the predetermined limits.

The comparison of one numerical value with respect to two numerical limits involves a process in which the single numerical value is determined to be numerically greater, between or less than the aforementioned limits. As to cases of equality with the limits, such may be classed either as between or outside the limits and do not need special consideration. The prior art of course has taught several approaches to the comparison of binary numbers but in all known techniques a large quantity of apparatus is needed and consequently a typical comparison operation requires a considerable amount of time.

The usual approach involves adding to or subtracting from a reference binary number the binary number to be compared, with the sum or difference being positive, zero, or negative, depending upon the relative value of the binary number. The parallel or serial operation in adding or subtracting necessarily involves the apparatus required to carry or borrow and such operations may also require clock pulses for correct timing. Two such comparisons are required by the prior art to determine whether data lies between two limits or not.

In parallel adding or subtracting the ordinary arithmetic operation starts with the least significant signal bit and progresses to the most significant bit at a maximum speed as defined by the speed of the carry or borrow circuits. As will be seen in greater detail hereinafter, a primary embodiment of my invention effects a simultaneous comparison with both limits, and indicates a decision at the earliest possible time, with no need for timing pulses.

As to specific prior art developments, the Ayres Patent No. 2,844,309, although similar to the present invention in relating to an asynchronous system not requiring precise uniformity of information supply, nevertheless only determines the relative magnitudes of two numbers, and in so doing requires significantly more hardware than is required by the present invention.

The Fillebrown et al. Patent No. 2,884,616 represents a device designed to compare one number or even several numbers with a given number R, and determine whether the compared numbers are smaller than, larger than or equal to R. However, these comparisons are effected one at a time and do not possess the advantageous quality of simultaneous comparison possessed by the present invention. Along the same line is the Johnson Patent No. 2,900,620 which only teaches the comparison of two numbers against each other, which would necessarily entail two separate comparisons being effected in order for such a device to perform the function of the present three-word asynchronous comparator and thus add delay and expense to the operation.

A primary embodiment of this invention may take the form of a digital comparator for simultaneously comparing a binary input number against two other binary numbers of the same length, with the comparison advantageously starting from the most significant bit of the binary numbers and progressing toward the least significant bit. The comparator comprises a sequential system of NOR gate stages each of which comprises eight logical elements which are substantially symmetrically divided between a high limit channel and a low limit channel. Each channel has input means for each stage in the form of a high limit register and a low limit register so that the upper and lower limits observed by each stage may be established in the decreasing order of binary significance.

It should be noted that the high limit channel may be advantageously used as a comparator system for comparing only two binary numbers, thus enabling my comparator system to be used in the most economical manner required by the usage specified. Such a two number comparator may comprise first and second logic gates capable of performing an AND function, and a third logic gate connected to the outputs of said first and second logic gates for ORing and amplifying a signal emanating from either of latter gates. The third logic gate has an output for indicating when the digits are equal, whereas outputs from the first and second logic gates indicate whether the first digit is greater or less than the second.

As will be apparent, basic stages comprising two logic gates for performing AND functions and a logic gate connected to the outputs of such gates to perform an OR function may be utilized in combinations to perform comparisons upon either two or three numbers simultaneously, and connected in series to make comparisons upon numbers of any length, the number of stages being determined by the digits of the binary number.

In a three-number comparator, a data register is provided for inserting into each stage the appropriate bit of the binary number so that comparison of the input data bit of each stage may be made simultaneously with the upper and lower limit bits of the same significance, latter being stored in upper and lower limit registers. In the case of a two-number comparator, means are provided for inserting into each stage appropriate bits of two binary numbers so as to effect a simultaneous comparison between a data number and a reference number, the comparison in each instance starting with the most significant bit so as to arrive at a comparison in the shortest time.

Indicating means are provided for indicating if a binary input number is higher than the upper limit or lower than the lower limit in the event of a three-word comparator, as well as whether a given binary input number is between the limit numbers of such a comparator. Additional means are provided for activating the appropriate indicating means as to the time any stage encounters the bit of a binary input number that exceeds the limits of that stage. Appropriate means are also provided for the two-word comparator, which indicate that one number is higher, lower or equal to the other.

As will also be apparent, the functions of the present invention can be realized in a substantially simpler manner than by the use of other comparators, and advantageously the logic for effecting the "in limits or not" may use identical NOR circuits, with the only change required being in the number of inputs required. Because the present invention is based upon only a single logic circuit type, a number of basic units may be interconnected in the relatively simple manner described above to achieve a comparator of small and compact size as well as of simplified and inexpensive construction.

These and other objects, features and advantages of this invention will be more apparent from a study of the enclosed drawings in which.

Figure 1:
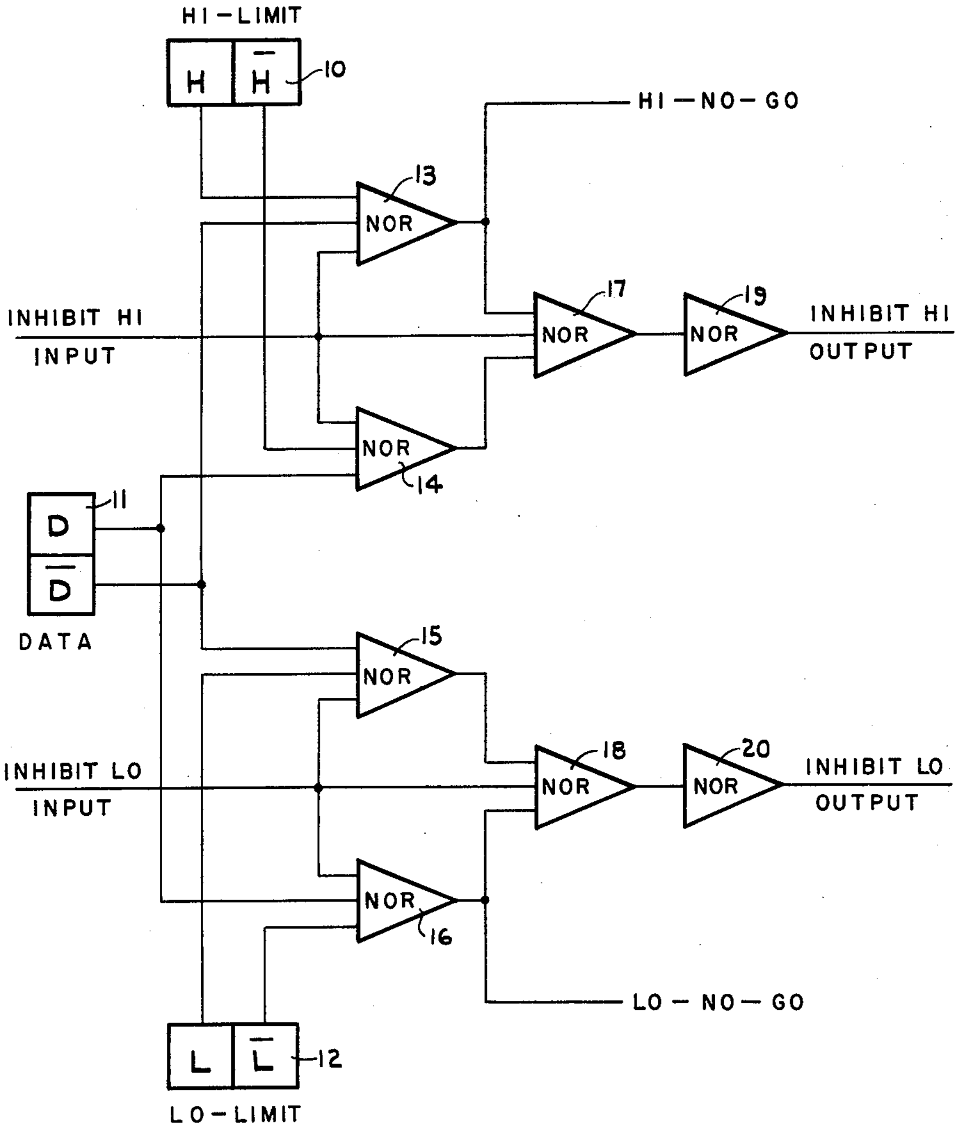
FIGURE 1 is a single exemplary stage of a three-number comparator circuit according to my invention which compares a binary number with two reference numbers.
Figure 3:
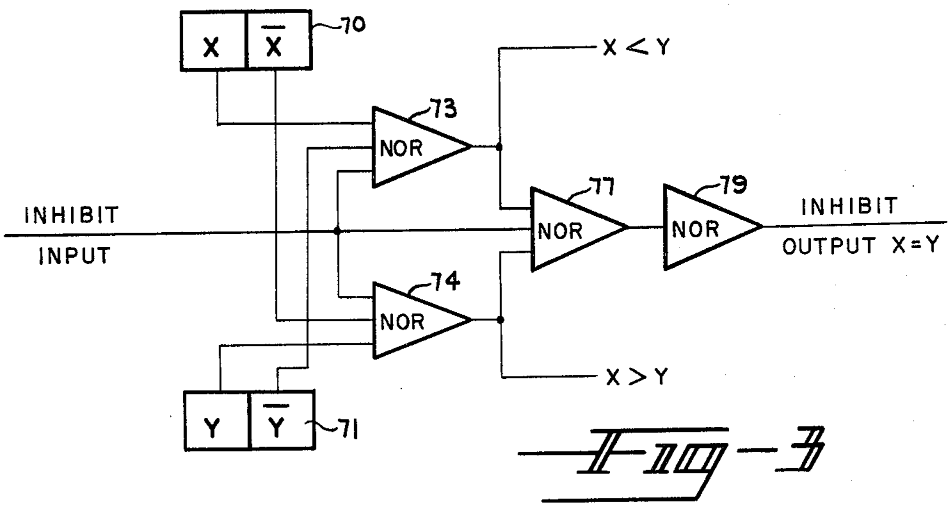
Figure 4:
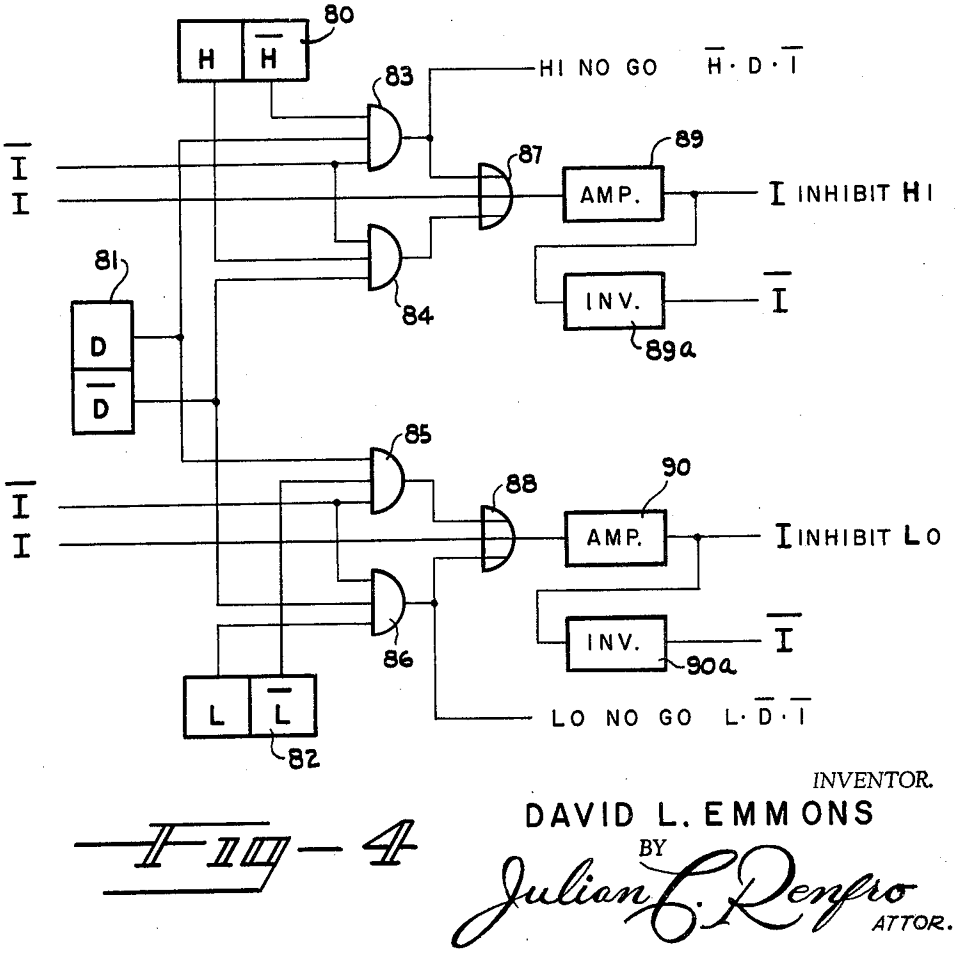

FIGURE 3 illustrates a two-number comparator stage according to my invention which determines if one number is numerically greater than, less than, or equal to another; and FIGURE 4 is a logic representation of the basic invention as illustrated in FIGURE 1, indicating that any straightforward AND-OR logic, when connected as shown in FIGURE 4, will perform the same logic functions shown in FIGURE 1, without limiting the invention to the use of NOR gates.

The single exemplary stage of a binary circuit according to my invention as illustrated in FIGURE 1 is adapted for simultaneously comparing a single binary bit, hereinafter referred to as the data bit, with a high limit bit and a low limit bit. A plurality of stages of the type shown in FIGURE 1 may be advantageously assembled into a multi-bit comparator of the type illustrated in FIGURE 2, with each stage of the comparator being arranged to receive binary level inputs from high limit and low limit storage registers as well as from a data storage register. Each comparator stage with the exception of the last stage is connected to another comparator stage of less significance so that a comparison begins with the most significant bit and progresses towards comparisons in stages of successively less significance.

Considering the single stage shown in FIGURE 1, the registers employed therein are a high limit storage register 10 having set side H and reset side $\overline{H}$; data storage register 11 having set side D and reset side $\overline{D}$; and a low limit storage register 12 having set side L and reset side $\overline{L}$. The $\overline{H}$, $\overline{D}$ and $\overline{L}$ levels are in each instance the complement of the set side of the particular register. In the preferred embodiment of this invention, each of these registers takes the form of a flip flop circuit that stores a binary number and its complement. Although I prefer the use of flip flops, any other type of device for the storage of binary numbers and having as an output the number and its complement may be used. Such storage devices may have as an input any logical arrangement taking information from some other binary generating device or storage device, such as a storage drum, tape, or punch card. The registers may be set for gating thereto voltage levels representing the binary numbers to the flip flops of the register, it being the function of the flip flops to hold the voltage levels representing the binary number so that the comparator can operate thereon.

EXEMPLARY STAGE OF COMPARATOR

In the logical function diagram shown as FIGURE 1, the upper half of this stage utilizes four NOR gates 13, 14, 17 and 19 disposed between the most significant bit of the data number and the most significant bit of the high limit number, whereas the lower half of this stage utilizes four NOR gates 15, 16, 18 and 20 disposed between the most significant bit of the data number and the most significant bit of the low limit number.

It is the function of the four upper NOR gates to ascertain whether the data word represented by voltage levels is less than, equal to or greater than the binary word stored in the high limit storage register 10, which, of course, is a numerical value represented by voltage levels, whereas it is the function of the four lower NOR gates to ascertain whether the data word represented by voltage levels is less than, equal to or greater than the binary word stored in the low limit storage register 12, which, of course, is also a numerical value represented by voltage levels.

The high limit storage register 10 is connected to gates 13 and 14 in such a manner that the number and its complement, which are represented by voltage levels, are placed in set side H and reset side $\overline{H}$, and because of the particular arrangement used, the voltage level stored in set side H appears at one input of gate 13, whereas a complement of this number appears as a voltage level input to one of the inputs of gate 14. Gates 13 and 14 as well as the other gates appearing in this and the other figures of the drawing are all standard NOR gates, such as of the type described in AIEE Transactions Paper No. 57–196 by Rowe and Royer (1956).

These gates are transistorized and function as inverting AND/OR logic elements in that they "and" and invert zero levels, and "or" and invert either positive or negative voltage levels. As to the latter statements, whether a positive or negative voltage level is implemented depends on the initial selection of a particular transistor type. For example, if PNP transistors are used as in the embodiment illustrated, a negative voltage supply is necessary. If for some reason NPN transistors were desired, a positive voltage power supply would be necessary. A system employing PNP transistors is illustrated herein inasmuch as such a system is compatible with a known system of automatic test equipment in which the comparator is used to discriminate a numerical value represented by binary number against a high and a low numerical limit also represented by binary numbers, and in this particular instance a minus 12 volt power supply is employed. Despite whether a positive or negative supply voltage is employed in the apparatus according to this invention the particular voltage level is chosen to meet the requirements of the particular type of PNP or NPN transistor parameters.

DETAILS OF EXEMPLARY STAGE

Considering the gates of FIGURE 1 in greater detail, gate 13, by virtue of its interconnection with the set side of the high limit storage register 10, the reset side of the data storage register 11, and the Inhibit Hi input, functions to decide if the data is higher in binary value than the high limit bit; if so, a digital ONE output appears at Hi No Go, but if not, it has a digital ZERO output. Gate 14, because of its interconnection with the set side of data storage register 11 and the reset side of high limit storage register 10 functions to decide if the data bit is lower than the high limit; if so, it has a ONE output, and if not has a ZERO output.

Therefore, if the Inhibit Hi Input is ZERO, and the Data bit is lower than the Hi Limit, the output from NOR gate 14 is a ONE, which will operate NOR gates 17 and 19 to furnish an Inhibit Hi Signal. When, however, the data and the high limit are equal, the output of both gates 13 and 14 is zero, allowing a comparison to take place in the next stage. Gate 17 serves to AND zeros and to OR ones, so consequently if all inputs are ZERO, a ONE output is obtained, but any ONE input gives a ZERO output. Gate 19 serves to invert the output of gate 17.

Considering a series arrangement of stages, therefore, if the Inhibit Hi Input from a preceding stage is introduced at the input to the gates of a given stage, such as NOR gates 13, 14 and 17, since gate 17 is connected to receive the outputs from gates 13 and 14, if a signal is received either from a preceding stage or from NOR gates 13 or 14 indicating respectively that a comparison has been made either in a preceding stage or in the present stage, a signal is generated at gate 17 which, if inverted will cause succeeding stages not to make erroneous comparisons. This inversion is of course brought about by NOR gate 19 whose output represents the Inhibit Hi Input for the next succeeding stage.

Although Diode "and" logic could be substituted for NOR gates 13, 14, 15, 16, 17 and 18, I prefer the use of the NOR gates throughout to make optimum use of a single type of logic element. For the highest possible speed and the most economical circuitry, the diode transistor logic configuration (DTL) should be used. However, any form of NOR gate preferred could be used and in the present instance, I prefer to use PNP transistors having a minus 12 volt power supply, as previously mentioned. Inasmuch as NOR gates "ands" zero levels and invert them to a ONE and "ors" one levels and inverts them to a ZERO, my invention utilizes DeMorgan's theorem by inverting the product of the inputs.

The low limit comparison with the data operates in much the same manner as the high limit comparison in that the low limit bit and its complement are connected to NOR gates 15 and 16 respectively and the data and its complement are connected to NOR gates 16 and 15 in the same manner as they are connected to NOR gates 14 and 13. This arrangement is such that the circuit will decide if the data is lower than the high limit, or higher than the low limit on the one hand, or whether on the other hand the data is higher than the high limit or lower than the low limit.

NOR gates 18 and 20 operate the same as NOR gates 17 and 19 to produce an Inhibit Low Output when the data is not the same as the low limit.

OPERATION OF EXEMPLARY STAGE

As to the operation of the side of the comparator stage of FIGURE 1 which compares between the data and the high limit input, the following conditions should be examined assuming that digital one is −12 volts and digital zero is zero volts.

(1) If the data is higher than the high limit, then the set side D of the data flip flop will be a digital one (−12 volts), which is connected to an input of gate 14. The set side of the high limit flip flop will be digital zero (0 volts), which is connected to an input of gate 13.

The complement of D, which is $\overline{D}$, is digital zero (0 volts) which is connected to an input of gate 13. If the Inhibit Hi Input is 0 volts, then all of the inputs to gate 13 are 0 volts. Because of NOR-gate action, the output of gate 13 is digital one (−12 volts). This digital one signal causes the output indicating circuitry hereinafter described to be operated so that the Hi No Go Indicator, hereinafter described, will be operated. Also the digital one output from gate 13 causes the output from gate 17 to be digital zero, which is inverted by gate 19 to digital one. This is the Inhibit Hi output, which causes all of the following stages to be inhibited or shut off.

(2) As to the instance in which the data is equal to the high limit, since the data and its complement are connected to gates 14 and 13 respectively and the output of the high limit flip flop and its complement are connected to gates 13 and 14 respectively, if the high limit and the data flip flops are set to the same state numerically, the outputs of gates 13 and 14 will always be 0 volts. In other words, because gate 13 has an input from the set side of the high limit flip flop and the reset side of the data flip flop, if the data and the high limit are equal, a −12 volt signal will always appear under these conditions at the input to gate 13, and conversely, a digital one signal will always appear at the input to gate 14.

The outputs of gates 13 and 14 will always be digital zero if the same numerical value is stored in both the high limit and the data limit flip flops.

If the Inhibit High Input is digital zero, and the outputs from gates 13 and 14 are digital zero, the output of gate 17 will be digital one, which is inverted by gate 19 to a digital zero, which is the Inhibit High Output, and since latter output is digital zero, the following stages are free to operate. Since the output of gate 13 is digital zero, the Hi No Go indicating circuitry hereinafter described does not operate.

(3) When the data is lower than the high limit, gate 14 has a digital zero input from the reset side of the high limit flip flop and a digital zero from the set side of the data flip flop.

If the Inhibit High Input is digital zero, all of the inputs to gate 14 will be digital zero, which causes the output of gate 14 to be digital one.

The digital one signal from the set side of the high limit flip flop causes gate 13 to have a digital zero output, which prevents the output indicating circuitry from operating.

The digital one output of gate 14 causes gate 17 to have a digital zero output, which, when inverted by gate 19, causes all of the following circuitry to be shut off.

As to the operation of the side of the comparator stage which compares between the data and the low limit, the following conditions should be examined.

(4) When the data is higher than the low limit, all of the inputs to gate 15 will be digital zero, because the reset side of the data flip flop and the set side of the low limit flip flop is digital zero. The output of gate 15 will thus be digital one, causing gate 18 to have a digital zero output, which when inverted by gate 20 to a digital one causes all of the following circuitry to be shut off. The digital one output of the low limit flip flop causes gate 16 to have a digital zero output which prevents the output indicating circuitry from operating.

(5) When the data is equal to the low limit, the outputs of both gates 15 and 16 are digital zero, for the same reasons as in (2) described hereinabove. Therefore the Inhibit Low Output and the output of gate 16 will be a digital zero.

(6) When the data is lower than the low limit, the inputs to gate 16 are all digital zeros, if the inhibit low input is digital zero, because the reset side of the low limit flip flop and the set side of the data flip flop are digital zero. Gate 16 now has a digital one output which operates the Low No Go indicating circuitry and gate 18 has a digital zero output which inverted by gate 20 causes all of the following circuitry to be shut off.

PLURALITY OF STAGES COUPLED TO FORM A COMPARATOR SYSTEM

Figure 2:
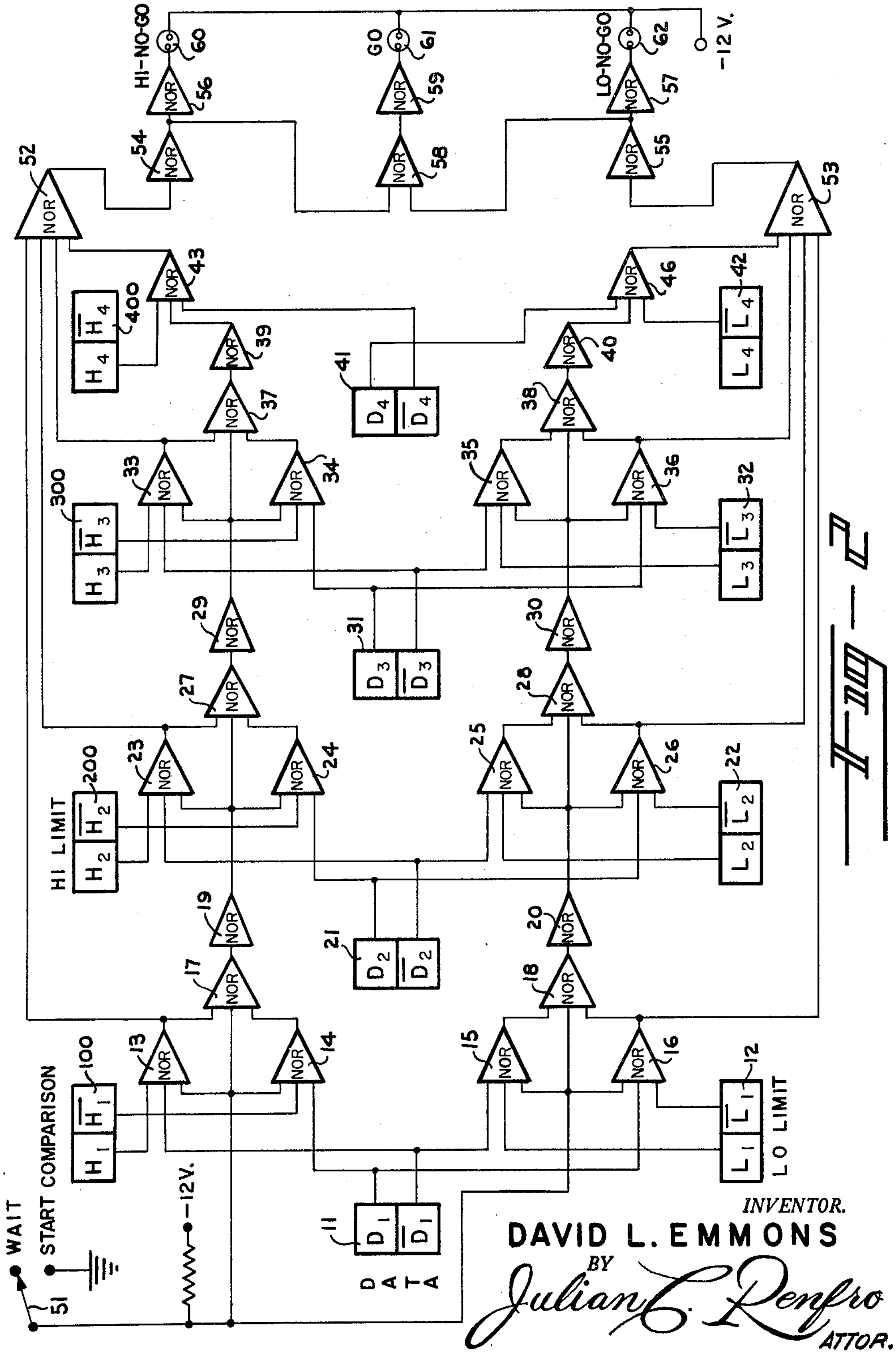
FIGURE 2 illustrates a three-number comparison system utilizing a plurality of such stages, and the inputs to each stage from each respective storage element.

Referring to FIGURE 2, a plurality of series connected stages of aforementioned comparator circuits is shown, representing a system which compares a 4-bit data word simultaneously with a 4-bit high limit number and a 4-bit low limit number. Obviously, a much larger number of stages could be added in series to increase the word length capabilities of the comparator.

The NOR gates 13 through 20 comprise a single stage of the comparator which receives inputs from the flip flops 100, 11 and 12, as well as from the start comparison input 51. The inputs to this particular stage are the most significant bits of data, high limit, and low limit information that are stored in flip flops 100, 11, and 12 as illustrated in FIGURE 2. Each following stage of the system is composed of similarly numbered gates, such as gates 23 through 30 and 33 through 40, with each successive stage operating upon bits of less significance. For example, if the first stage operates upon bits of $2^3$ significance, the next less significant stage as represented by the 20 series of gates operates upon bit values of $2^2$, the 30 series of gates upon bit values of $2^1$, and the 40 series of gates upon bit values of $2^0$.

As will be apparent, the outputs from flip flops 100, 11, and 12 are connected to the inputs of gates 13, 14, 15, and 16. The start comparison signal is connected to gates 13 through 18, and this could originate from other logic circuitry which would indicate to the comparator the correct time to start a comparison operation. When the start comparison signal is applied to the input of the first stage, the circuitry in the first stage is allowed to compare the first bit of the data number simultaneously with the first bit of the high and low limit numbers. Once the comparison operation has started, the comparison will continue to propagate from the most significant or first stage to the last stage or stage of least significance.

If at some point in the operation of the comparator a comparison is made which indicates that the data is either higher or lower than their respective limits, the indicating circuitry will indicate that the data is either higher or lower than the aforementioned limits. If the data is not higher or lower than the prescribed limits, a light which is connected to the indicating circuitry will indicate a go condition as will hereinafter be described.

NOR gates 52 through 59 comprise the output indicating circuitry of the comparator circuit, which are designed to indicate a high No Go, low No Go, or Go, these being depicted respectively by indicators 60, 62, and 61, respectively. These may for example be lamps.

Any one input to Gates 52 or 53 will cause either Gate 54 or Gate 55, respectively, to have a 1 output. If either one of the Gates 54 or 55 has a one output, it will cause Gates 56 or 57, respectively to operate the Hi No Go indicator 60, or the Lo No Go indicator 62, respectively. If neither of these gates have a one output, then by virtue of the circuitry the Gate 58 will have a one output, which will cause Gate 59 to operate the Go lamp 61.

*Example 1*

As an example of the operation of the comparator according to FIGURE 2, assume the following conditions:

| | |
|---|---|
| Hi Limit Register | 1010 |
| Data Register | 1100 |
| Lo Limit Register | 1001 |

For the high limit number 1010, the Hi Limit Register flip flop outputs are set so that $H_1$=digital one, $H_2$=digital zero, $H_3$=digital one and $H_4$=digital zero. The prime sides of the flip flops are set to the complements of the above conditions.

The digital number 1100 is set into the Data Register, so $D_1$ and $D_2$ are each set to digital one, and $D_3$ and $D_4$ are set to digital zero. The prime sides of these flip flops are set to the complements of their unprimed sides. The Lo Limit number 1001 is set into the Lo Limit Register so that $L_1$ and $L_4$=digital one and $L_2$ and $L_3$=digital zero.

The start comparison signal, which is digital ZERO, is applied to the inputs of NOR gates 13 thru 18. These gates are allowed to look at the relative binary level inputs from the most significant flip flops in the Hi, Lo and Data Register simultaneously. In this instance the inputs are all digital ONES and their complements are all digital ZEROS. The digital ONE signals, which are −12 volts, cause Gates 13 through 16 to have a digital ZERO output. The inputs to gates 17 and 18 are now all digital ZEROS which cause their outputs to be digital ONES. When inverted by Gates 19 and 20 the signals become digital ZEROS. The outputs of Gates 19 and 20 are connected to Gates 23 through 28. Since the signals from Gates 19 and 20 are digital ZEROS, Gates 23 through 28 are allowed to look at the outputs of $H_2$, $D_2$ and $L_2$ and their complements in the same manner that Gates 13 through 18 looked at $H_1$, $D_1$, and $L_1$ and their complements.

Since $H_2$, $\overline{D}_2$, and the output of Gate 19 are all digital ZEROS, the output of Gate 23 is digital ONE. This digital ONE signal causes Gate 52 to have a digital ZERO output which in turn switches Gate 54 to a digital ONE output. This digital ONE performs two functions—first, it causes Gate 56 to light lamp 60 which is the Hi No Go lamp, and secondly it causes Gate 58 to have a digital ZERO output which prevents Gate 59 from operating lamp 61 which is the Go Indicator Lamp.

The digital ONE output of Gate 23 is inverted to a digital ZERO by Gate 27 and inverted again by Gate 29. Gate 29 now has a digital ONE output which causes Gates 37 and 39 to switch so that Gate 39 has a digital ONE output. This digital ONE output causes Gate 43 to have a digital ZERO output and the digital ONE output from Gate 29 causes Gate 33 to have a digital ZERO output. Thus it can be seen that any time that Gates 19, 29, or 39 have a digital ONE output, all of the circuitry following these gates is made inoperative by the fact that digital ONES are produced by Gates 19, 29 or 39 when a comparison has been made in that stage.

*Example 2*

As another example of my comparator, assume the following conditions:

| | |
|---|---|
| Hi Limit Register | 1110 |
| Data Register | 1101 |
| Lo Limit Register | 1011 |

This set of conditions should yield a Go indication since the four bit data number is lower in binary value than the four bit hi-limit number and higher than the four bit lo-limit number.

Referring again to FIGURE 2, when the start comparison signal switches from digital ONE to digital ZERO, Gates 13 through 18 are allowed to look at these respective inputs from the Hi Limit, Lo Limit and Data Registers. Since all of these inputs ($H_1$, $L_1$, $D_1$) are digital ONES, the outputs of Gates 13 through 16 are digital ZERO. Gates 17 and 19 have a digital ONE output because all of their inputs are digital ZERO. Gates 19 and 20 have a digital ZERO output because of their digital ONE inputs. The outputs of Gates 19 and 20 (digital ZERO) are connected to the inputs of Gates 23 through 28 and because of their digital ZERO inputs from Gates 19 and 20, they are allowed to look at the binary level inputs of $H_2$, $D_2$, and $L_2$. The digital ONE outputs of $H_2$ and $D_2$ cause Gates 23 and 24 to have a digital ZERO output. However, the digital ONE from $D_2$ causes Gate 26 to have a digital ZERO output and Gate 25 now has all digital ZERO inputs which cause the output of Gate 28 to have a digital ZERO output. This signal is inverted by Gate 30 to a digital ONE which causes all of the following circuitry to be inhibited, as shown in Example 1.

Now the low side of the comparator has been shut off without indicating a Lo No Go but the hi side is still allowed to go to the next stage because the data and the hi-limit were both digital ONES and no comparison was made.

The digital ZERO output of Gate 29 is connected to the inputs of Gates 33, 34, and 37. This signal allows Gates 33, 34, and 37 to look at their inputs from $H_3$ and $D_3$. The digital ONE input to Gate 33 from $H_3$ causes its output to switch to digital ZERO. The inputs to Gate 34 are all digital ZERO which causes its output to be digital ONE. When this digital ONE is connected to Gate 37 it causes the gate to switch to digital ZERO and Gate 39 inverts this digital ZERO to digital ONE. All of the following circuitry is inhibited or shut off by propagating this digital ONE from the stage where it originated to the last stage of the circuit. In this example, all of the circuitry was inhibited without generating a Hi No Go or Lo No Go signal so the output of both Gates 52 and 53 are a digital ONE.

This causes the outputs of Gates 54 and 55 to be a digital ZERO. The inputs to Gate 58 are all ZERO which causes its output to a digital ONE. This digital ONE causes Gate 59 to have a digital ZERO output and this causes Lamp 61 to indicate a Go condition.

*Example 3*

As a third example of my invention, assume the following:

| | |
|---|---|
| Hi Limit Register | 1110 |
| Data Register | 1010 |
| Lo Limit Register | 1100 |

In this example, the Lo Limit word is higher in binary value than the Data word and the comparator should indicate a Lo No Go condition.

When the Start Comparison Signal switches from digital ONE to digital ZERO, Gates 13 through 18 are allowed ot look at their respective inputs from the Hi, Lo and Data Registers. Since all of these inputs ($H_1$, $L_1$, $D_1$) are digital ONES, the outputs of Gates 13 through 18 are digital ZEROS.

Gates 17 and 18 have a digital ONE output because of their digital ZERO inputs. Gates 19 and 20 have a digital ZERO output because of their digital ONE inputs. This digital ZERO from both Gates 19 and 20 allow Gates 23 through 28 to look at their respective inputs. The digital ONE from $H_2$ causes Gate 23 to have a digital ZERO output. The inputs to Gate 24, however, are all digital ZERO, so Gate 24 will have a digital ONE output which in turn switches all of the following circuits to the inhibited position described in preceding examples.

The inputs to Gate 26 are all digital ZERO which cause the output to be digital ONE. This digital ONE signal causes the indicator circuitry to indicate a Lo No Go by operating gates 53, 55 and 57, as described previously. This digital ONE signal also causes gate 28 to have a digital ZERO output which, when inverted by gate 30, inhibits all of the following circuits in the manner previously described.

Turning to FIGURE 3, an embodiment of my invention is revealed, which may be utilized to determine whether one number is equal to, higher than or lower than another binary number. Although the comparison of two binary numbers is not new to the state of the art, the particular technique herein employed is unique inasmuch as fewer logical elements are used to perform a comparison function between two binary numbers.

As will be noted from a comparison of this figure with FIGURE 1, FIGURE 3 in effect represents basically the same configuration as used in the high limit channel of FIGURE 1 with the addition of an output means for indicating the Y is less than X. As will be noted, the X side of the flip flop 70 is connected to one input of gate 73, whereas the $\overline{X}$ of the flip flop 70 is connected to gate 74. Similarly, the Y side of the flip flop 71 is connected to one input of gate 74 and the $\overline{Y}$ side of latter flip flop is is connected to one input of gate 73. An inhibit input is provided at one input of gates 73, 74, and 77, so that in the event that X is greater than Y, or Y was greater than X in a previous stage, gates 73, 74, and 77 would be inhibited. If the inhibit input is digital zero and X is equal to Y, all of the inputs of gate 77 will be digital zero which causes gate 77 to have a digital one output which is inverted by gate 79 to a digital ZERO. If gate 79 has a digital ZERO output, the succeeding stages are allowed to continue the comparison operation, whereas if gate 79 has a digital ONE output, the succeeding stages are not allowed to operate. When X is greater than Y, gate 74 will have a digital one output by ANDing $\overline{X}\ Y\ \overline{I}$, and similarly if Y is greater than X, gate 73 will have a digital ONE output by ANDing $X\ \overline{Y}\ \overline{I}$.

The outputs of all the gates indicating that Y is greater than X are OR'd by a single OR gate which is connected to some indicating means for indicating that Y is greater than X, whereas all the outputs indicating that X is greater than Y are OR'd together and connected to some indicating means for indicating that X is greater than Y.

During the time that the X and Y flip flops are being set or reset, the comparison operation is inhibited by an inhibit input to the most significant stage. At the time that the X and Y register loading is completed, the inhibit signal is removed and the comparator is allowed to operate.

While I have described and illustrated a comparator utilizing NOR gates, it is within the spirit of my invention to perform the required Boolean functions represented by $$\text{Above limits}=\overline{H}D\overline{I}$$
$$\text{Upper channel inhibit}=\overline{I}H\overline{D}+\overline{H}D\overline{I}+I$$
$$\text{Lower channel inhibit}=\overline{L}D\overline{I}+L\overline{D}\overline{I}+I$$
$$\text{Below limits}=L\overline{D}\overline{I}$$

with any compatible system of logic gates.

FIGURE 4 illustrates the mechanization of the aforementioned Boolean functions according to this invention. Any type of logic element which would perform the required logic functions would result in the same outputs or indications as that of FIGURE 4.

For example, in some instances, logic AND functions can be performed with gates such as 83 through 86, and OR functions accomplished by gates 87 and 89 and by gates 88 and 90 of FIGURE 4, in a manner similar to that previously described. An inverter 89*a* can be employed to generate an $\overline{I}$ signal from the I signal from amplifier 89 in the event a succeeding stage is to be used, and inverter 90*a* serves a similar purpose with respect to the output from amplifier 90.

My invention has capabilities beyond that described herein, and I am not to be limited to the particular applications of my invention, except as required by the scope of the appended claims.

I claim:

1. A high speed comparator for comparing two binary digits, comprising first and second logic gates capable of performing an AND function, each of said gates having a plurality of input means, including means for inserting input binary digits, and having a separate output, a third logic gate connected to the outputs of said first and second logic gates for ORing and amplifying a signal emanating from either of latter gates, said third logic gate having an output for indicating when said input digits are equal, said first and second logic gates being employed to indicate by their respective outputs whether the first digit is numerically greater than or less than the second digit, and additional means for accomplishing a comparison of three binary digits, comprising fourth, fifth and sixth logic gates, said fourth and fifth logic gates being capable of performing an AND function and each having a plurality of input means as well as separate outputs, and a sixth logic gate connected to the outputs of said fourth and fifth logic gates for ORing and amplifying a signal emanating from either of latter gates, high limit and low limit storage registers for supplying inputs to said first and second, and said fourth and fifth gates respectively, data storage register means for supplying information to said first and second as well as said fourth and fifth gates representing the binary digit to be compared with said limits, and output indicating means connected to said fifth gate for indicating the relationship of the number stored in said data storage register to the number stored in said low limit storage register.

2. A high speed comparator for comparing two binary digits, comprising first and second logic gates capable of performing an AND function, each of said gates having a plurality of input means, including means for inserting input binary digits, and having a separate output, a third logic gate connected to the outputs of said first and second logic gates for ORing and amplifying a signal emanating from either of latter gates, said third logic gate having an output for indicating when said input digits are equal, said first and second logic gates being employed to indicate by their respective outputs whether the first digit is numerically greater than or less than the second digit, and additional means for accomplishing a comparison of three binary digits, comprising fourth, fifth and sixth logic gates, said fourth and fifth logic gates being capable of performing an AND function and each having a plurality of input means as well as separate outputs, and a sixth logic gate connected to the outputs of said fourth and fifth logic gates for ORing and amplifying a signal emanating from either of latter gates, high limit and low limit storage registers for supplying inputs to said first and second, and said fourth and fifth gates respectively, a data storage register for supplying information to said first and second as well as said fourth and fifth gates representing the binary digit to be compared with said limits, means for selectively inhibiting the operation of said first, second and third logic gates, and separate means for selectively inhibiting the operation of said fourth, fifth and sixth logic gates, thus to allow a separate comparison operation to occur in the non-inhibited gates between the data and the limit number associated with the non-inhibited gates, and output means connected to said first and fifth gates for indicating the relationship between the binary digit to be compared and said limits.

3. An arrangement of logic stages for comparing one binary number stored in a binary data storage element against another binary number stored in another binary data storage element, each of said storage elements having provisions for set and reset inputs, with the number of logic stages determining the number of bits in the numbers to be compared, each stage comprising at least three gates, each of said gates having a plurality of input means and a separate output, two of said gates having their inputs connected to receive inputs from set and reset sides of said binary data storage elements so that said gates can perform an ANDing function upon such inputs, a third gate in each stage connected to the outputs of said ANDing gates and arranged to perform an ORing function on the outputs thereof, each third gate of each stage having an input from any immediately preceding stage, and an output whose signal represents an indication whether two digits compared in such stage were numerically equal or unequal, said output serving to inhibit any following stages in the event of non-equality, said first and second gates indicating by their outputs whether one number is numerically higher or lower than the other number.

4. A comparator arrangement as defined in claim 3 in which duplicate stages of the same level of comparison are provided paralleling each of the previously mentioned stages, each duplicate stage being comprised of two ANDing gates and one ORing gate, means for providing input information to each of said gates such that the input information can be simultaneously compared with upper and lower limit information, the comparison being made commencing with the most significant bit, and indicating means connected at each stage for indicating if the number at this point is greater or less than or between the limits as defined by the input information.

5. A high speed comparator for comparing two binary numbers, each number being at least two digits in length, said comparator comprising a plurality of comparator stages, the number of stages being dependent upon the number of digits in the numbers to be compared, each stage having logic gates for performing three elementary logic functions, first and second of the logic gates of the first stage being provided for performing an AND function, each of latter gates having a plurality of input means, including means for inserting input binary digits from data storage elements, and each having a separate output, a third logic gate of said first stage connected to receive the outputs of said first and second logic gates for ORing and amplifying a signal emanating from either of latter gates, an additional comparator stage connected to said first stage, and having gates for performing three additional elementary logic functions, said additional stage having gates connected in the same manner as said first, second and third gates, with first and second gates of said additional stage being arranged to receive an input from said third logic gate of said first stage in the event an equality of the input digits to the first stage requires a comparison to be made in the second stage, said first and second gates of said additional stage also receiving input binary digits, a third gate of the gates of said additional stage being connected to the outputs of the first and second additional logic gates for ORing and amplifying a signal emanating from either of latter gates, each subsequent stage of the comparator required for an additional digit of number length being sequentially connected to the immediately preceding stage.

6. A digital comparator for simultaneously comparing a binary input number against two other binary numbers of the same length, said comparison starting from the most significant bit of the binary numbers and progressing toward the least significant bit, comprising a system of logic gates stages each having input and output means, said stages being substantially symmetrically divided between a high limit channel and a low limit channel so that the upper and lower limits to be observed by each stage may be established in the decreasing order of binary significance, means for inserting into the input means of each stage the appropriate bit of the binary input number so that comparison of the input bit of each stage may be made with limit bits of the same significance, and indicating means connected to said output means for indicating the relationship of the binary input number to the limits.

7. A digital comparator for simultaneously comparing a binary input number against two other binary numbers of the same length, said comparison starting from the most significant bit of the binary numbers and progressing toward the least significant bit, comprising a sequential system of logic gate stages, each of said stages comprising logic elements which are substantially symmetrically divided between a high limit channel and a low limit channel, each stage of each channel having logic elements for performing two logical AND functions and one logical OR function, input means for each stage in the form of a high limit register and a low limit register, so that the upper and lower limits to be observed by each stage may be established in the proper stage of the channel in the corresponding decreasing order of binary significance, a data register for inserting into each stage the appropriate bit of the binary input number so that comparison of the input bit of each stage may be made with limit bits of the same significance inserted in the limit registers, indicating means connected to the outputs of each stage of each channel for indicating whether or not a binary input number is higher than the upper limit or lower than the lower limit, and additional indicating means connected to the aforementioned indicating means for indicating whether a given binary input number is between the limit numbers.

8. The digital comparator as defined in claim 7 including means for activating appropriate indicating means as of the time that any stage encounters a bit of a binary input number that does not fall within the limits of that stage.

9. A digital comparator for simultaneously comparing a binary input number against two other binary numbers of the same length, said comparison starting from the most significant bit of the binary numbers and progressing toward the least significant bit, comprising a sequential system of logic gate stages, each of said stages comprising four logical AND functions and two logical OR functions substantially symmetrically divided between a high limit channel and a low limit channel, with means for selectively inhibiting either channel separately when a comparison has been made in that channel, each channel having input means for each stage in the form of a high limit register and a low limit register, so that the upper and lower limits to be observed by each stage may be established in the decreasing order of binary significance, a data register for inserting into each stage the appropriate bit of the binary input number so that comparison of the input bit of each stage may be made with limit bits of the same significance inserted in the limit registers, indicating means connected to the outputs of each stage of each channel for indicating whether or not a binary input number is higher than the upper limit or lower than the lower limit, and additional indicating means connected to the aforementioned indicating means for indicating whether a given binary input number is between the limit numbers, and means connected so as to activate appropriate indicating means as of the time that any stage encounters the bit of a binary input number that exceeds the limits of that stage.

10. A digital comparator for simultaneously comparing a binary input number against two other binary numbers of the same length, said comparison starting from the most significant bit of the binary numbers and progressing toward the least significant bit, comprising a sequential system of NOR gate stages, each of said stages comprising a minimum of eight logic elements which are substantially symmetrically divided between a high limit channel and a low limit channel, each channel having input means for each stage in the form of a high limit register and a low limit register, so that the comparison of a data number with the upper and lower limits is observed by each stage and established in the decreasing order of binary significance, a data register for inserting into each stage the appropriate bit of a data input number so that comparison of the input bit of each stage may be made with limit bits of the same significance inserted in the limit registers, indicating means for each channel connected to the outputs of each stage of indicating whether or not a binary input number is higher than the upper limit or lower than the lower limit, and additional indicating means connected to the aforementioned indicating means for indicating whether a given binary input number is between the limit numbers, and means connected so as to activate appropriate indicating means as of the time that any stage encounters the bit of a binary input number that exceeds the limits of that stage.

References Cited by the Examiner

UNITED STATES PATENTS

| | | | |
|---|---|---|---|
| 2,900,620 | 8/1959 | Johnson ---------- | 235—177 X |
| 2,984,822 | 5/1961 | Armstrong et al. --- | 235—177 X |
| 2,984,824 | 5/1961 | Armstrong et al. -- | 340—146.2 X |
| 3,094,614 | 6/1963 | Boyle -------------- | 235—176 |

OTHER REFERENCES

Pages 62 and 63, January 1961, Boswell, "Digital Comparison, by NOR Logic," Instruments and Control Systems.

ROBERT C. BAILEY, *Primary Examiner.*

MALCOLM A. MORRISON, *Examiner.*

C. L. WHITHAM, M. J. SPIVAK, *Assistant Examiners.*